(12) United States Patent
Murray et al.

(10) Patent No.: US 8,849,967 B2
(45) Date of Patent: Sep. 30, 2014

(54) PASSIVE ACTIVATION OF BOOTLOADER NETWORK FEATURES

(75) Inventors: Mark R. Murray, Atlanta, GA (US); Phillip M. Hord, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 775 days.

(21) Appl. No.: 12/503,322

(22) Filed: Jul. 15, 2009

(65) Prior Publication Data

US 2011/0016304 A1 Jan. 20, 2011

(51) Int. Cl.
*G06F 15/177* (2006.01)
*G06F 15/16* (2006.01)
*H04L 29/08* (2006.01)
*H04N 21/61* (2011.01)
*H04N 21/443* (2011.01)
*G06F 9/445* (2006.01)

(52) U.S. Cl.
CPC ............ *H04L 67/34* (2013.01); *H04N 21/6125* (2013.01); *H04N 21/4432* (2013.01); *G06F 9/445* (2013.01)
USPC ........................................................ 709/222

(58) Field of Classification Search
USPC ........................... 709/222; 717/168, 172, 178
See application file for complete search history.

(56) References Cited

U.S. PATENT DOCUMENTS

| | | | | |
|---|---|---|---|---|
| 6,393,585 | B1 * | 5/2002 | Houha et al. | 714/23 |
| 7,673,297 | B1 * | 3/2010 | Arsenault et al. | 717/168 |
| 8,042,048 | B2 * | 10/2011 | Wilson et al. | 715/736 |
| 2004/0024688 | A1 * | 2/2004 | Bi et al. | 705/37 |
| 2004/0093370 | A1 * | 5/2004 | Blair et al. | 709/200 |
| 2004/0249906 | A1 | 12/2004 | Olbricht et al. | 709/220 |
| 2005/0144651 | A1 * | 6/2005 | Prus et al. | 725/134 |
| 2009/0158096 | A1 * | 6/2009 | Ali et al. | 714/43 |
| 2010/0058385 | A1 * | 3/2010 | Mitchals et al. | 725/39 |
| 2010/0332816 | A1 * | 12/2010 | Murray | 713/2 |
| 2012/0185942 | A1 * | 7/2012 | Dixon et al. | 726/24 |

* cited by examiner

*Primary Examiner* — Tauqir Hussain
(74) *Attorney, Agent, or Firm* — Merchant & Gould

(57) ABSTRACT

Consistent with embodiments of the present invention, systems and methods are disclosed for operating an override boot sequence. In some embodiments, a system may be disclosed comprising a computing device; client software configured to boot the computing device to a normal state; a first memory associated with the computing device, wherein the client software is stored on the first memory; and a network interface in communication with a server. The server may be configured to transmit a sentry packet to the computing device. A bootloader program may be associated with the computing device, wherein the bootloader device may be configured to open the network interface port associated with the serve and monitor for the presence of the sentry packet. The bootloader program may be further configured to download a software application across the network and execute the software application instead of the client software.

17 Claims, 3 Drawing Sheets

PASSIVE ACTIVATION OF BOOTLOADER NETWORK FEATURES

FIELD OF THE DISCLOSURE

The present disclosure relates to passively overriding normal boot sequences and allowing downloaded operations to run in place of the normal boot sequences upon detection of a sentry packet.

BACKGROUND

At times it may be necessary to override a normal boot sequence. For example, it may be desired for an Internet Protocol Television ("IPTV") set-top box to allow for special applications to run. Thus, it may be desirable to override the normal boot sequence and launch a different application. Furthermore, it may be desirable to passively download and run an override boot sequence without disturbing the current state of the IPTV set-top box.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure.

DESCRIPTION OF EXAMPLE EMBODIMENTS

Overview

Figure 1:
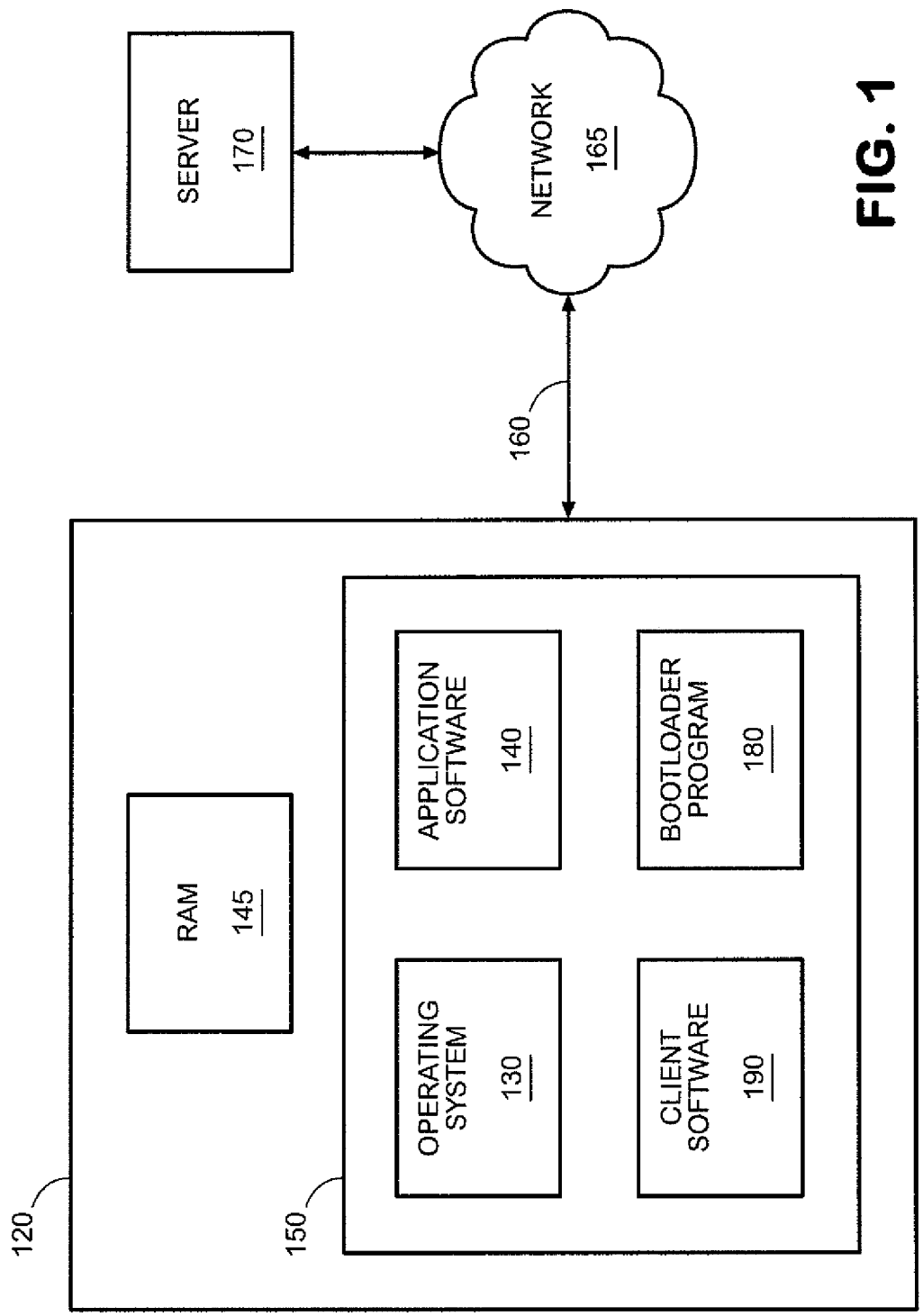
FIG. 1 is a block diagram showing operating embodiments of the invention.

Consistent with embodiments of the present invention, systems and methods are disclosed for operating an override boot sequence. In some embodiments, a system may be disclosed comprising a computing device; client software configured to boot the computing device to a normal state; a first memory associated with the computing device, wherein the client software is stored on the first memory; and a network interface in communication with a server. The server may be configured to transmit a sentry packet to the computing device. A bootloader program may be associated with the computing device, wherein the bootloader device may be configured to open the network interface port associated with the serve and monitor for the presence of the sentry packet. The bootloader program may be further configured to download a software application across the network and execute the software application instead of the client software.

In some embodiments, a method may be disclosed comprising opening a port on a network interface; and monitoring the port for the presence of a sentry packet. Upon detection of the sentry packet a software application may be downloaded over the network; and the software application may be executed instead of a normally executed client application.

In some embodiments, a computer-readable medium may store a set of instructions which when executed performs a method comprising: monitoring for the presence of a sentry packet at a network interface connected to an IPTV set-top box and detecting the presence of a sentry packet. The method may download a software application upon detecting the presence of the sentry packet; and execute the software application instead of the normal boot sequence on the set-top box.

Both the foregoing general description and the following detailed description are examples and explanatory only, and should not be considered to restrict the invention's scope, as described and claimed. Further, features and/or variations may be provided in addition to those set for the herein. For example, embodiments of the invention may be directed to various feature combinations and sub-combinations described in the detailed description.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

DETAILED DESCRIPTION

During a normal booting sequence, a bootloader for a device may typically load locally stored client software to provide instructions for the device. For example, an IPTV set-top box may contain a bootloader which may load normal client software to configure a user's viewing experience.

FIG. 1 illustrates an environment in which embodiments of the invention may be located. An IPTV set-top box 120 may provide a consumer interactive entertainment through the communication of information over a network 165 and subsequent display to a consumer. IPTV set-top box 120 may contain an operating system 130 and application software 140 stored in a memory 150. Memory 150 may be a disk, flash memory, or any other memory capable of storing programming instructions. IPTV set-top box 120 may further contain a communications interface 160 capable of communicating with a server 170 over network 165 over a Dynamic Host Configuration Protocol (DHCP) which may provide a framework for passing configuration information to hosts on a TCP/IP network.

Among application software 140 may be a bootloader program 180. Bootloader program 180 may be provided to operate a boot sequence for IPTV set-top box 120. During typical operation, bootloader program 180 may load locally stored client software 190 to provide instructions for IPTV set-top box 120. For example, bootloader program 180 may load normal client software 190 to configure a particular user's viewing experience.

However, in situations where it may be desirable to run software different from normal client software 190, bootloader program 180 may monitor network 165 to detect the presence of a sentry packet from server 170. In some embodiments, the bootloader program 180 may only monitor a port on network 165 for a small passive window, such as 250 ms. Similarly, server 170 may need to be capable of transmitting the sentry packet over network 165 to IPTV set-top box 120 at a frequency fast enough to ensure receipt of the sentry packet before the passive window closes. Bootloader program 180 may then download a software application across network 165 in response to receiving the sentry packet. Bootloader program 180 may determine if the override application is formatted properly for IPTV set-top box 120.

In some embodiments, each override application may contain a unique ID to identify itself to the downloading IPTV set-top box 120. The unique ID may be associated with the network port ID number. The unique ID may provide information to IPTV set-top box 120 so that IPTV set-top box 120 may be prepared to save and execute the override application.

Bootloader program 180 may further determine if the override application contains a valid digital signature. If the override application may be found to be properly formatted and signed, the override application may be copied to RAM 145 in IPTV set-top box 120. The downloaded override application may then be executed without disturbing the storage state of IPTV set-top box 120.

In some embodiments, a field installer may need to activate a special configuration screen to select home installation values or options for IPTV set-top box 120. Bootloader program 180 may trigger such an activation without the need for user input by running the override application downloaded from server 170 to RAM 145 upon detection of the sentry packet. The downloaded override application may contain instructions to activate the special configuration screen.

In some embodiments, a diagnostic application may need to run a basic functional test or a specialized test of IPTV set-top box 120 without disturbing the current software image in IPTV set-top box 120. Such a test may be easily run by an in-home technician or in the factory after the production software has been loaded by use of a properly formatted override application downloaded from server 170 to RAM 145 upon detection of the sentry packet. The override application may contain instructions to operate the diagnostic application.

In some embodiments, a cleaning application may need to be launched in order to perform a basic functional test and restore IPTV set-top box 120 back to factory defaults and erase any stored content on IPTV set-top box 120. Such a procedure may need to be run when client software becomes outdated or may not support updated features. In some embodiments, the cleaning application may be employed to refurbish a device used by a previous customer to restore the device to a factory state and subsequently provide the device to a new customer. A downloaded override application may contain instructions to operate the cleaning application.

Figure 2:
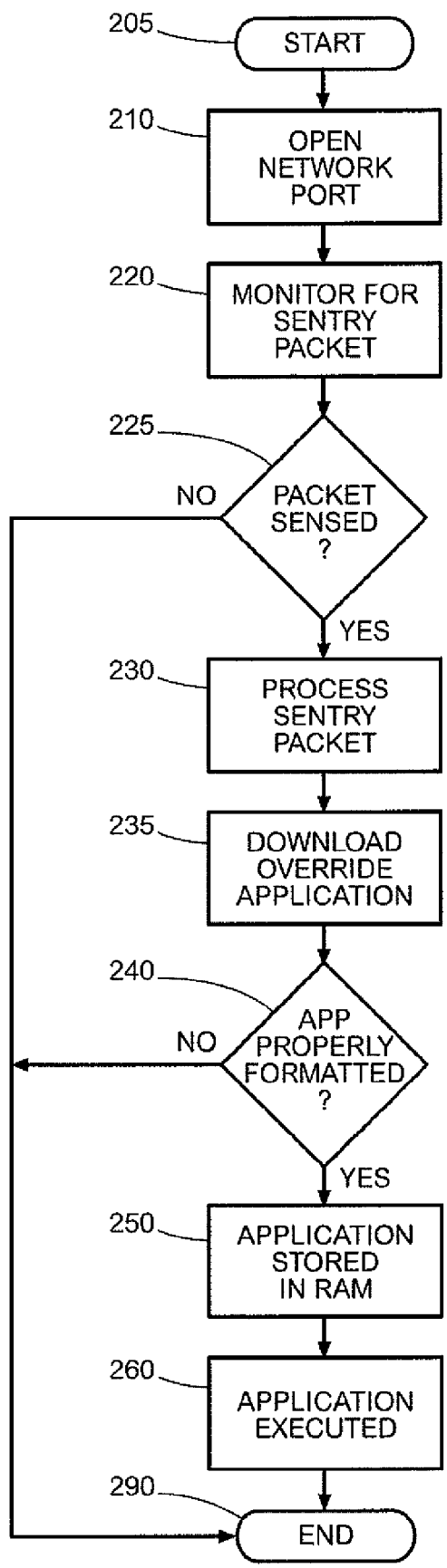
FIG. 2 is a flow chart illustrating operation of embodiments of the invention.

FIG. 2 illustrates a flow chart showing embodiments of the present invention. The method may start at step 205. The method may proceed to step 210 where a device may open up a port through a network interface across a communications network. The port may be associated with a communications path with a particular server. The device may be pre-programmed to monitor a specific port associated with a server, such as server 170. The device may be IPTV set-top box 120. However, it should be noted that in some embodiments the device may be any device requiring operation of a boot sequence.

The method may then advance to step 220 where a bootloader program, for example, bootloader program 180 may passively monitor for the presence of a sentry packet. The sentry packet may contain information to trigger IPTV set-top box 120 to download override programming to run in place of the device's typical boot sequence. In some embodiments, bootloader program 180 may monitor the port for a predetermined period of time. At step 225 is may be determined whether or not the sentry packet has been sensed. If the sentry packet is not sensed as being available from the server, the method may end at step 290.

If the sentry packet is detected from the server, the method may then advance to step 230 where the bootloader program may process the information contained on the sentry packet.

In some embodiments, the sentry packet may notify the device that an override application is ready for download from a server. In some embodiments, the sentry packet may trigger the downloading of the override application. The download may take place as a unicast download using Internet Friendly Transport-Level Protocol (IFTP). In some embodiments, the download may occur across a multicast transaction using a protocol such as Internet Group Management Protocol (IGMP).

The method may next proceed to step 240, where bootloader program 180 may determine if the override application is formatted properly for the particular device. For example, the device may want to avoid executing instructions that may not comport with proper associated operation. In some embodiments where the device may be an IPTV set-top box, it may additionally be determined at step 240 whether the override application corresponds to the model of the IPTV set-top box. If the override application is not formatted properly for the particular device, the method may end at step 290.

In some embodiments, if the override application is formatted properly for the particular device, the bootloader program may determine if the override application contains a valid digital signature. Usage of a digital signature may be important to prevent unauthorized override applications from being loaded which may cause security risks. If the override application does not contain a valid digital signature, the method may end at step 290.

If the override application is formatted properly, the method may advance to step 250 where the override application may be copied to random access memory in the device. For example, the override application may be stored on RAM 145 in IPTV set-top box 120. It should be noted that while some embodiments describe the random access memory being in the device, the random access memory may be located in an external bootloading device or a separate external memory.

The method may then proceed to step 260 where the override application may then be executed without disturbing the storage contents of the device. The override application may contain instructions to operate configuration programs, cleaning programs, repair programs, user interface programs, or any other program which may differ from normal client software 190. The method may then end at step 290.

Figure 3:
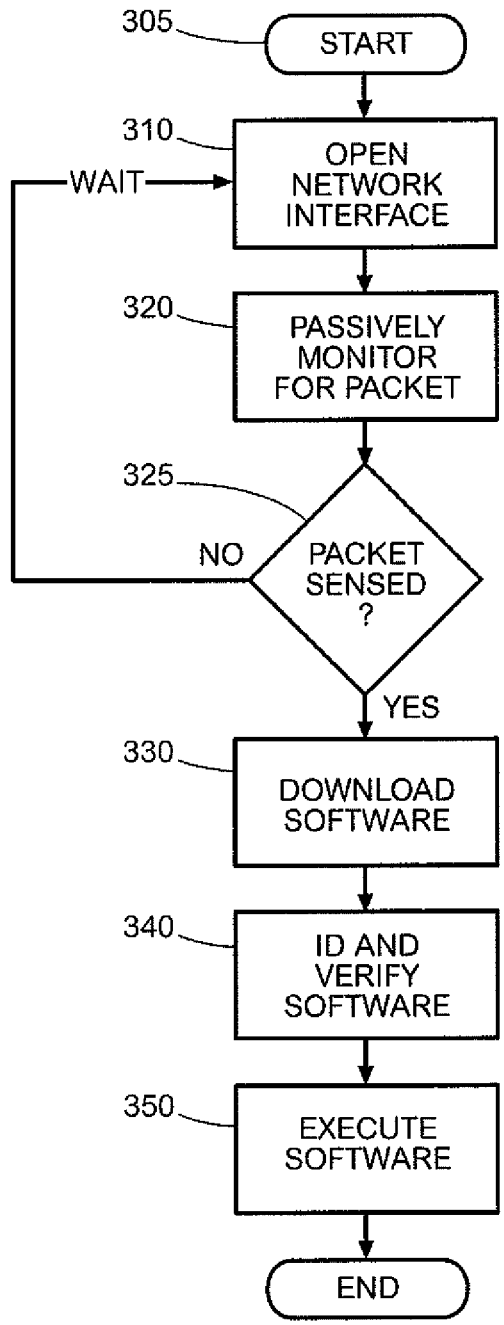
FIG. 3 is a flow chart illustrating operation of embodiments of the invention.

FIG. 3 illustrates a flow chart showing embodiments of the present invention. The method may start at step 305. The method may next proceed to step 310 where a device connected to a network may open a network interface for a small time window. In some embodiments, the time window may be around 250 ms. The device may be connected to a server within a local network, or a LAN, such as the Internet. The device may be connected through a DHCP interface.

After a network interface may be established in step 310, the method may proceed to step 320. At step 320, the device may passively monitor for a packet to be transmitted by the server. As the monitoring time window may be very short, the server may be capable of transmitting the packet at a frequency fast enough to be complete within the monitoring time window. The packet may be a sentry packet. In some embodiments, the sentry packet may contain a value recognizable by the monitoring device to identify the presence of the sentry packet.

At step 325 is may be determined whether or not the sentry packet has been sensed. If the sentry packet is not sensed during the passive monitoring window in step 325, the method may wait a predetermined period of time and return to step 310 and continue monitoring. If the sentry packet is sensed during the passive monitoring window in step 325, the method may proceed to step 330. At step 330, the device may activate a network function and download software applications. The download may be effected in either unicast or multicast mode. The sentry packet may act as a trigger packet to trigger the downloading of software without user interaction. The software may contain an override application to be run by the device instead of booting the normally used client software.

Once an override application, or other appropriate software, has been downloaded to the device, the method may proceed to step 340. At step 340, the device may identify and verify the downloaded software. In some embodiments, the network port ID may serve as an identifier for the device to recognize the software it may be downloading. In some embodiments, verifying the software may include checking for a valid signature.

Once the software may be identified and verified, the method may proceed to step 350 where the software may be executed to perform instructions on the device instead of running the normal boot sequence of the device. After execution of the software, the method may end at step 360.

The methods and systems described may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

The flow charts, messaging diagrams, state diagrams, and/or data flow diagrams herein provide examples of some embodiments of the present invention. Alternatively, these diagrams may be viewed as depicting actions of an example of a method implemented by some embodiments of the invention. Blocks in these diagrams represent procedures, functions, modules, or portions of code which include one or more executable instructions for implementing logical functions or steps in the process. Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A system comprising:
   a computing device;
   client software configured to boot the computing device to a normal state;
   a first memory associated with the computing device, wherein the client software is stored on the first memory;
   a network interface in communication with a server;
   the server configured to transmit a sentry packet to the computing device, wherein the sentry packet contains software download trigger information;
   bootloader program associated with the computing device, wherein the bootloader program is configured to open the network interface port associated with the server and monitor for the presence of the sentry packet; and
   the bootloader program further configured to download a software application across the network upon detection of the presence of the sentry packet and processing of the software download trigger information, and execute the downloaded software application instead of the client software, wherein executing the downloaded software application further comprises running a diagnostic program on the computing device needed to run a specialized test of a set top box, wherein the downloaded software contains a unique ID to identify itself to a downloading IPTV set-top box, and wherein the downloaded software is found to be properly formatted and signed for the IPTV set-top box.

2. The system of claim 1, wherein the bootloader program associated with the IPTV set-top box downloads the software application using one of unicast or multicast transmission.

3. The system of claim 1, wherein the bootloader program monitors for the sentry packet without user input.

4. The system of claim 1, wherein the network interface port is opened and monitored periodically for a predetermined period of time.

5. The system of claim 1, wherein if no sentry packet is detected, the bootloader program closes the network interface.

6. The system of claim 5, wherein if no sentry packet is detected, the bootloader program boots the client software.

7. A method comprising:
opening a port on a network interface;
monitoring the port for the presence of a sentry packet, wherein the sentry packet contains software download trigger information;
downloading a software application separate from the sentry packet over the network upon detection of the sentry packet, wherein executing the downloaded software application further comprises running a diagnostic program on the computing device needed to run a specialized test of a set top box, wherein the software application contains a unique ID to identify itself to a downloading IPTV set-top box, and wherein the software application is found to be properly formatted and signed for the IPTV set-top box; and
executing the software application instead of a normally executed client application.

8. The method of claim 7, further comprising:
determining whether the downloaded software application contains a valid digital signature.

9. The method of claim 7, wherein the network port is open for a pre-determined period of time.

10. The method of claim 7, wherein executing the downloaded software application further comprises running a configuration program on the set-top box.

11. The method of claim 10, wherein the downloaded software application is identified with a unique ID.

12. The method of claim 11, wherein the unique ID is based on the network port ID.

13. A computer comprising one or more processors which store a set of instructions which when executed performs a method comprising:
monitoring for the presence of a sentry packet at a network interface connected to an IPTV set-top box, wherein the sentry packet contains software download trigger information;
detecting the presence of a sentry packet;
downloading a software application separate from the sentry packet upon detecting the presence of the sentry packet, wherein the software application contains a unique ID to identify itself to the IPTV set-top box, and wherein the software application is found to be properly formatted and signed for the IPTV set-top box; and
executing the downloaded software application instead of the normal boot sequence on the set-top box, wherein executing the downloaded software application further comprises running a diagnostic program on the computing device needed to run a specialized test of a set top box.

14. The computer of claim 13, wherein the downloaded software application operates to provide a configuration screen to select installation options for the IPTV set-top box.

15. The computer of claim 13, wherein the downloaded software application operates to run testing software without disturbing the client software stack associated with the IPTV set-top box.

16. The computer of claim 13, wherein the downloaded software application operates to restore the IPTV set-top box to factory default settings.

17. The computer of claim 13, further comprising:
determining whether the downloaded software application is formatted for a computing device; and determining whether the downloaded software application contains a valid digital signature.

* * * * *